May 12, 1970  R. G. LYBEN  3,511,617
CATALYTIC MUFFLER

Filed June 9, 1967  3 Sheets-Sheet 1

RAYMOND G. LYBEN
INVENTOR

ATTORNEY

May 12, 1970

R. G. LYBEN 3,511,617

CATALYTIC MUFFLER

Filed June 9, 1967

RAYMOND G. LYBEN
INVENTOR

ATTORNEY

United States Patent Office 3,511,617
Patented May 12, 1970

3,511,617
CATALYTIC MUFFLER
Raymond G. Lyben, Detroit, Mich., assignor to Ethyl Corporation, New York, N.Y., a corporation of Virginia
Filed June 9, 1967, Ser. No. 645,059
Int. Cl. B01j 9/04; F01n 3/14
U.S. Cl. 23—288                                    15 Claims

ABSTRACT OF THE DISCLOSURE

A non-plugging muffler adapted to contact exhaust gas with a treating agent comprising a body containing one or more compartments with an exhaust conduit extending through each compartment, each conduit connected in series or parallel with the next adjoining conduit, forming a continuous exhaust path through the one or more conduits, the conduits having rows of louvers along opposing surfaces arranged transverse to the axis of the conduit such that one row of louvers scoops exhaust gas into the space outside the conduit, but within the compartment, and the opposing row aspirates exhaust gas from this space back into the conduit, causing the exhaust gas to circulate within the space outside the conduit whereat it contacts an exhaust conditioning agent such as alumina, alumina impregnated with metal catalysts, or wire mesh.

BACKGROUND

The exhaust gas of internal combustion engines contains varying amounts of carbon monoxide, unburned hydrocarbons, nitrogen oxides, particulates and other minor constituents. It is desirable that these materials in exhaust gas be minimized because some of them are reported to contribute to air pollution. For example, atmospheric nitric oxide in the presence of sunlight forms ozone, which in turn reacts with certain atmospheric hydrocarbons, forming irritants.

Much work has been done in an effort to eliminate the noxious constituents of exhaust gas. This has included carburetor modifications resulting in improved combustion efficiency, air injection into the exhaust manifold, recycle of crankcase vent gas, direct flame oxidation of exhaust gas, and the use of cyclones and filters for removing particulate matter in exhaust gas. Of these various methods, promising results have been obtained by the method of contacting the exhaust gas with a conditioning agent contained in a muffler-like device. For example, the exhaust gas may be passed directly through a muffler filled with an exhaust gas oxidation catalyst, referred to as a catalytic muffler. One major problem in this method has been that the usual approach has been to merely pass the exhaust gas through a bed of the conditioning agent. Unfortunately, as the conditioning agent ages it frequently crumbles or compacts, making it difficult for the exhaust gas to pass through the bed. This results in an increase in back pressure in the exhaust system and decreased engine efficiency. In extreme cases actual blockage of the exhaust system can occur.

SUMMARY

An object of this invention is to provide a means of contacting the exhaust gas of internal combustion engines with an exhaust gas conditioning agent without the danger of an increase in back pressure as the conditioning agent ages. This is accomplished by providing an article of manufacture comprising a closed container having one or more compartments with an exhaust gas conduit extending through each of the one or more compartments, said conduits communicating with each other in series or parallel when there is more than one conduit such that they form a serial or parallel continuous path for the exhaust gas through each of the one or more compartments. Arranged in rows along opposing surfaces of the exhaust conduit are louvers cut transverse to the axis of the conduit and in a manner such that they extend into the exhaust gas flow and one row of louvers serves as scoops to deflect the passing exhaust gas into the substantially annular space outside the exhaust gas conduit, but within the compartment through which the conduit passes. The opposing rows of louvers serve to aspirate the exhaust gas from the substantially annular space back into the exhaust gas conduit with the result that the exhaust gas circulates in the substantially annular space. In so doing, the exhaust gas contacts an exhaust gas conditioning agent contained within the annular space and is made less noxious in one or more respects. A feature of the exhaust treating device is that no matter how much resistance is offered to the flow of the exhaust gas through the annular space containing the exhaust conditioning agent, the exhaust system cannot build up excessive back pressure because there always remains a clear free path through the exhaust conduit or series of exhaust conduits.

Another object is to provide an exhaust treating device which also serves to replace the muffler usually employed in an exhaust system.

A further object is to provide a catalytic muffler eminently suitable for catalyzing the oxidation of unburned hydrocarbons and carbon monoxide in the exhaust gas of internal combustion engines.

A still further object is to provide a muffler device which functions to remove particulate matter from exhaust gas such as the combustion products of tetraethyllead and other additives frequently used in fuels for internal combustion engines.

The invention is best understood by reference to the accompanying drawings of preferred embodiments of the invention.

DESCRIPTION OF THE PREFERRED EMBODIMENTS

Figure 1:
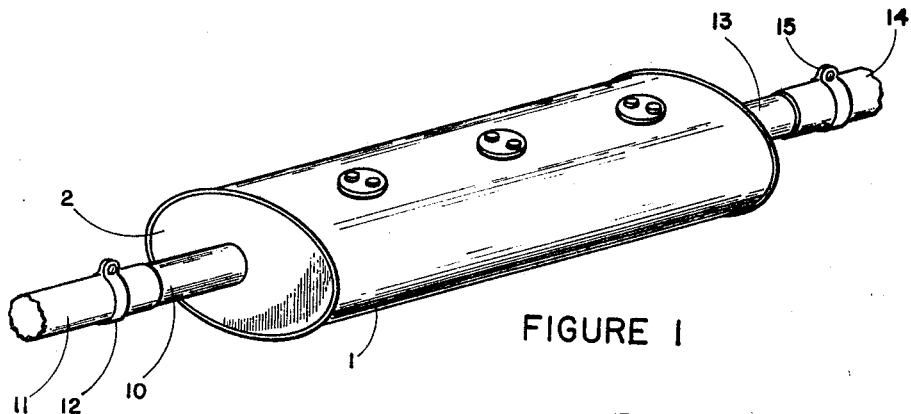
FIG. 1 is a perspective view of the device in its simplest form and connected to the exhaust inlet and outlet pipes in a typical installation.
Figure 2:
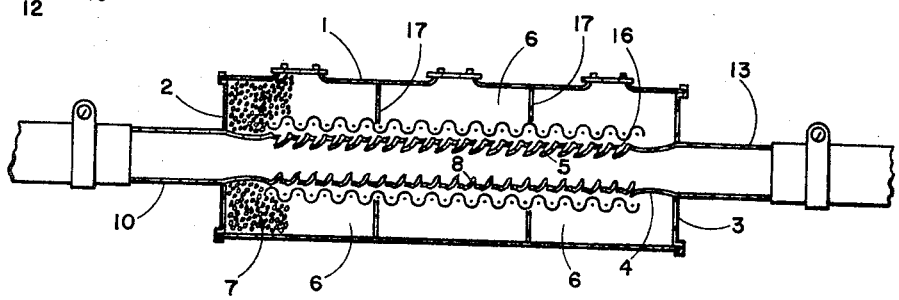
FIG. 2 is a longitudinal cross-section of the simple single-pass exhaust treating device showing the opposing rows of louvers in the exhaust gas conduit.
Figure 3:
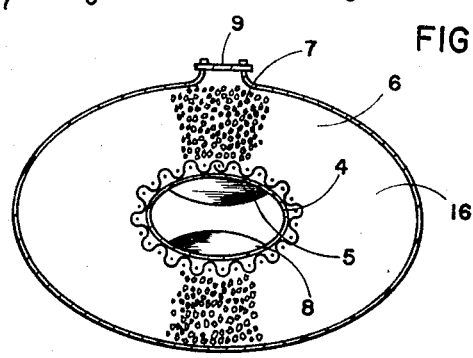
FIG. 3 is a cross-section of the muffler transverse to its longitudinal axis showing the walls of the body and the centrally located louvered conduit. Also shown is the substantially annular space between the conduit and the walls of the body containing an exhaust conditioning agent.
Figure 4:
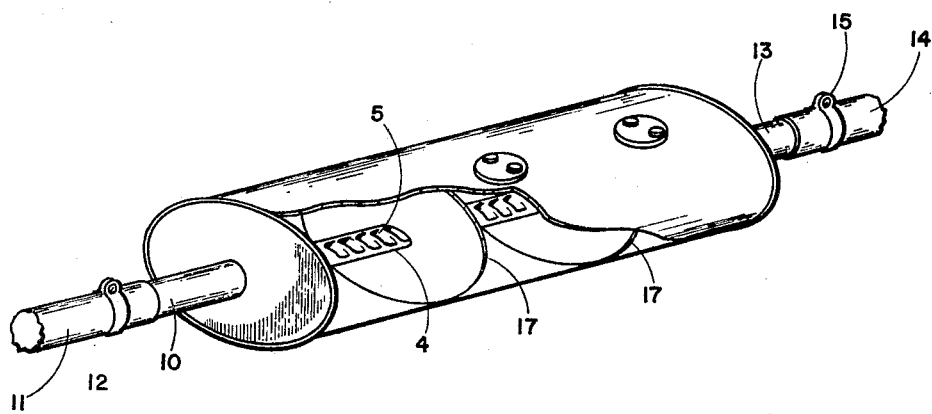
FIG. 4 is a cut-away perspective view of the muffler showing the louvered conduit within the muffler body and baffle plates separating the annular space within the muffler into substantially annular compartments.

The exhaust conditioning device of this invention is a combination muffler and exhaust treating device; that is, it not only functions to reduce the undesirable constituents of exhaust gas, but it also serves to muffle the sound of the internal combustion engine with which it is used. In its simplest embodiment, shown in FIGS. 1–4, muffler is formed by elongated body 1 with closures 2 and 3 on both ends. Extending through end closures 2 and 3 is exhaust gas conduit 4. Conduit 4 has louvers cut transverse to the axis of the conduit and arranged in rows along opposing surfaces. One row of louvers 5 functions to deflect exhaust gas passing through conduit 4 out through the exit louver 5 and into substantially annular space 6 where the exhaust gas contacts exhaust gas conditioning agent 7. The opposing row of louvers 8 functions to aspirate the conditioned exhaust gas from annular space 6 through inlet louvers 8 back into exhaust conduit 4.

Prior to operation, annular space 6 can be filled with exhaust conditioning agent 7 through port 9. In embodiments having a plurality of annular compartments, described hereafter, a plurality of ports will be required—one for each annular compartment. Actually, the muffler in any of its embodiments serves to reduce the particulate matter in exhaust gas even without placing an exhaust gas conditioning agent in the annular space. However, the efficiency of the muffler is improved by use of an exhaust gas conditioning agent and, thus, in the preferred embodiments to be described, an exhaust gas conditioning agent is employed. However, it is understood that the mufflers have a beneficial effect even when they do not contain an exhaust gas conditioning agent and require no ports. Also, the conditioning agent can be installed during manufacture and no port would be required.

In operation, the inlet end 10 of exhaust conduit 4 is slidably engaged with the exhaust pipe 11 of an internal combustion engine and held secure by bracket 12. Exhaust pipe 11 is connected at its other end with the exhaust manifold of an internal combustion engine. Exhaust conduit exit 13 is normally connected with tail pipe 14, held firm by bracket 15, which tail pipe serves to discharge the treated exhaust gas at a desirable remote location. Exhaust gas from the internal combustion engine is conducted through exhaust pipe 11 to inlet end 10 of exhaust conduit 4. When desired, supplemental air can be mixed with the exhaust gas prior to entering the muffler employing either an air pump or a simple venturi type inductor. Supplemental air is usually desirable when the exhaust conditioning agent functions to catalyze the oxidation of the unburned constituents of exhaust gas. The exhaust gas passes into conduit 4 wherein it is continuously scooped out through exit louvers 5 into annular space 6 whereat it contacts exhaust gas conditioning agent 7 while circulating in annular space 6. The exhaust gas then returns to conduit 4 through inlet louvers 8 which extend into the exhaust conduit and are inclined in the direction of exhaust gas flow and thereby exert an aspirating effect on the exhaust gas in annular space 6, urging the treated exhaust gas into conduit 4. On the average, each molecule of exhaust gas makes several excursions through annular space 6 and is thoroughly contacted by exhaust conditioning agent 7. Finally, the treated exhaust gas leaves the muffler through exit end 13 of conduit 4. It then passes through tail pipe 14 and is finally discharged into the atmosphere.

In a refinement of the exhaust treating device, conduit 4 is surrounded by exhaust conditioning agent retaining means 16 which prevents exhaust gas conditioning agent 7 from entering conduit 4 through louvers 5 or 8, but does not interfere with the flow of exhaust gas through the louvers. A screen with a mesh smaller than the diameter of the exhaust conditioning agent can serve this function.

In a further refinement, substantially annular space 6 is segregated into a plurality of substantially annular compartments by baffle plates 17. In this embodiment, contact between the exhaust gas and the conditioning agent is increased because the exhaust gas scooped out of conduit 4 and into the first annular compartment nearest the exhaust inlet is forced to circulate within that compartment before it can progress towards exhaust exit end 13. In effect, the exhaust gas tends to circulate in each annular compartment resulting in excellent contact between the exhaust gas and the conditioning agent.

Figure 5:
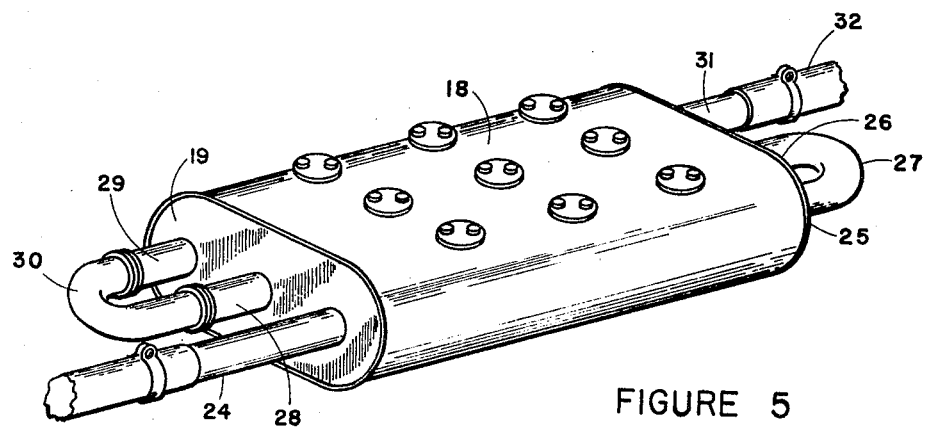
FIG. 5 is a perspective view of an embodiment of the invention having three louvered exhaust conduits connected in series contained within one muffler body.
Figure 6:
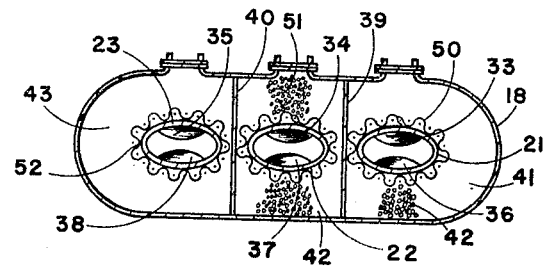
FIG. 6 is a cross-section of the 3-pass muffler transverse to its longitudinal axis showing the three louvered conduits centrally located within the longitudinal compartments.
Figure 7:
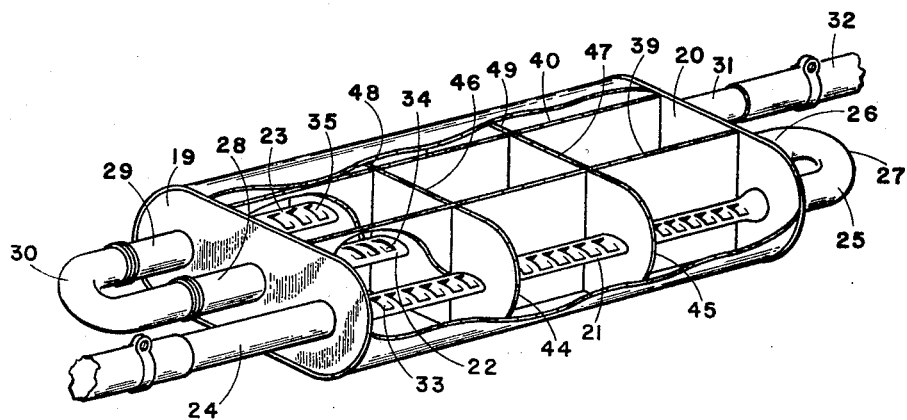
FIG. 7 is a cut-away perspective view of the 3-pass muffler showing the three louvered exhaust conduits in place within the muffler body which is divided into three longitudinal chambers by partition members. The space outside the louvered conduit within each longitudinal chamber is further partitioned by substantially annular baffle plates into three substantially annular compartments.

Another embodiment of the invention is a series multipass exhaust gas conditioning muffler as depicted in FIGS. 5, 6 and 7. This embodiment comprises a body 18 having end closures 19 and 20 with a plurality of exhaust conduits 21, 22 and 23 extending longitudinally through body 18 and end closures 19 and 20. First exhaust conduit 21 slidably engages at its inlet end 24 the exhaust pipe of an internal combustion engine, which in turn communicates with the exhaust manifold of an internal combustion engine and functions to conduct the exhaust gas from the engine to exhaust inlet 24 of first conduit 21. As described in a previous embodiment, air can be mixed with the exhaust gas prior to entering the first conduit. The exit end 25 of first conduit 21 communicates with the inlet end 26 of second conduit 22 through conduction means 27. The exit end 28 of second conduit 22 communicates with the inlet end 29 of third conduit 23 through conduction means 30, forming a continuous exhaust flow path through the series of conduits and finally engaging at exit end 31 of final conduit 23 exhaust pipe 32 which serves to conduct the exhaust gas to a remote point at which it is discharged into the atmosphere. Each conduit has longitudinal rows of louvers extending into the exhaust flow cut transverse to the axis of the conduits along opposing surfaces of the conduits. Louver rows 33, 34 and 35 on each conduit are depressed into and against the exhaust gas flow in conduits 21, 22 and 23 such that they tend to deflect the exhaust gas out of the conduits and into the space outside the conduit, but within the body and end closures. Opposing louver rows 36, 37 and 38 disposed along the opposing surface of each conduit are depressed into the exhaust gas flow, but in a direction opposite to those in the first row of louvers on the conduit such that the second row of louvers aspirates the exhaust gas back into the conduits. The direction of each row of louvers can be reversed without disturbing their function as long as the opposing rows in each conduit are in opposite directions.

The operation of this multi-pass embodiment of the invention is similar to that of the single-pass embodiment. The space outside the exhaust conduit and within the body and end closures is, if desired, first filled with an exhaust gas conditioning agent. Exhaust gas which may be mixed with air enters first conduit 21 through inlet end 24. In passing through conduit 21 it encounters the plurality of exit louvers 33 and is deflected into the space outside the conduit where it contacts exhaust gas conditioning agent. It then circulates in the space outside the conduit and re-enters one of the conduits through inlet louvers 36, 37 or 38. In the refined embodiment shown in the drawing, longitudinal partition members 39 and 40 divide the body into a plurality of longitudinal chambers 41, 42 and 43, each containing an exhaust conduit. This restricts the flow of exhaust gas in the space within the body such that the exhaust gas deflected through exit louver 33 in conduit 21 remains in the substantially annular space outside conduit 21 and within longitudinal chamber 41 contacting exhaust gas conditioning agent 42 until it is aspirated back into conduit 21 through inlet louver 36. The same applies to each of the respective longitudinal chambers. Hence, the longitudinal partition members serve to prevent exhaust gas from entering the exhaust treated space within the body through louvers 33 of conduit 21 and circulating directly to inlet louvers 37 or 38 in conduits 22 or 23, thus permitting a reduction in the total amount of contact between the exhaust gas and the exhaust gas conditioning agent.

The preferred embodiments depicted in the drawing contain a further improvement in the use of baffle plates 44, 45, 46, 47, 48 and 49 which serve to divide the substantially annular spaces within the three longitudinal chambers formed by partition members 39 and 40 into three substantially annular compartments, each containing exhaust gas conditioning agent. This refinement further improves the contact between the exhaust gas and the conditioning agent by forcing the exhaust gas to repeatedly circulate in a plurality of confined areas.

A further improvement embodied in the drawing shown clearly in FIG. 6 is the use of retaining means 50, 51 and 52 to prevent the loss of exhaust conditioning agent 42 through inlet or outlet louvers 33, 34, 35, 36, 37 or 38. A screen wrapped around conduits 21, 22 and 23 in the louver area serves this function very well.

Figure 8:
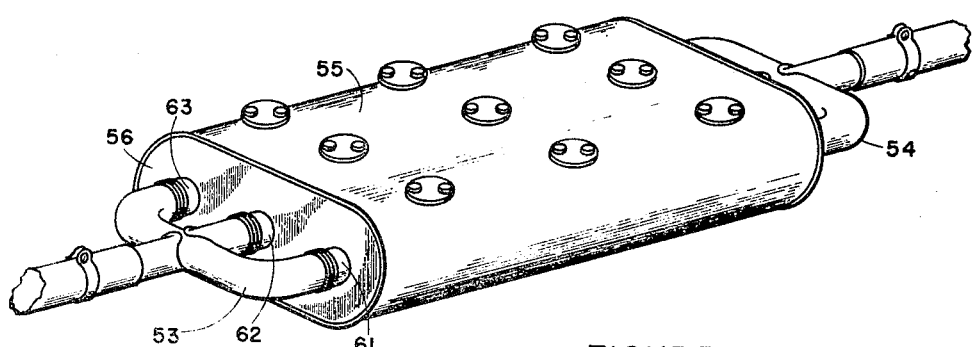
FIG. 8 is a perspective view of an embodiment of the muffler having three louvered exhaust gas conduits connected in parallel using inlet and outlet headers.
Figure 9:
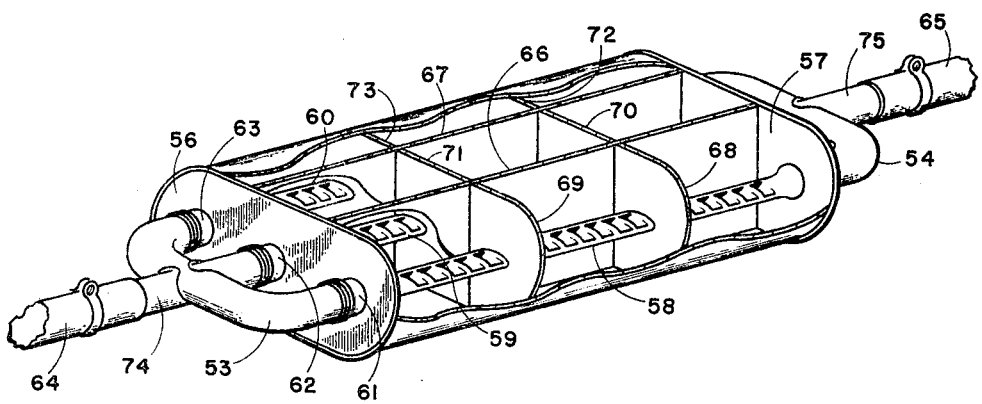
FIG. 9 is a cut-away perspective view of the three parallel conduit muffler showing 9 substantially annular compartments in which the exhaust conditioning agent is placed.

A highly preferred embodiment of the muffler is a multiconduit muffler wherein the louvered conduits are connected in parallel by use of inlet and outlet headers as shown in FIGS. 8 and 9. In practice, the series multi-pass muffler shown in FIGS. 5-7 can be converted to the parallel multi-conduit muffler by merely replacing the conduction means 27 and 30 with exhaust inlet and outlet headers 53 and 54 and making the necessary modification of exhaust inlet 24 and exhaust outlet 31 so that they can engage the inlet and outlet headers. If the series multi-pass muffler has been constructed in a manner such that the top louvers on each conduit act as scoops and deflect exhaust gas out of the conduit and the opposing bottom louvers aspirate exhaust gas back into the conduit, then the adjoining conduits in the series multi-pass muffler will have oppositely inclined louvers because in the series multi-pass muffler the exhaust gas in adjoining conduit flows in opposite directions. If this muffler is changed to the parallel flow multi-conduit muffler shown in FIGS. 8 and 9 by replacing the conduction means with inlet and outlet headers, then the exhaust flow direction in conduit 22 will be reversed and the bottom louvers will act as scoops deflecting the exhaust gas out of the conduit and the top louvers will aspirate the exhaust gas back into conduit 22. This will not affect the operation of the louvered muffler because all that is required is that the opposing rows of louvers on each conduit are inclined into the exhaust stream in opposite directions so that no matter what the direction of flow, one row will serve to scoop exhaust gas out of the conduit and the opposing row will aspirate exhaust gas back into the conduit. Hence, in any of the mufflers: single-pass, series multi-conduit or parallel multi-conduit, the conduits can be installed with the row of exit louvers and the opposing row of inlet louvers disposed in any plane.

The multi-conduit parallel flow muffler shown in FIGS. 8 and 9 comprises body 55 with end closures 56 and 57. Extending longitudinally through body 55 and end closures 56 and 57 are a plurality of exhaust gas conduits 58, 59 and 60 which have exhaust gas inlet ends 61, 62 and 63 and exhaust gas outlet ends. Inlet ends 61, 62 and 63 engage exhaust gas inlet header 53, which in turn engages exhaust pipe 64. The exhaust gas outlet ends of conduits 58, 59 and 60 communicate with exhaust outlet header 54, which in turn engages tail pipe 65, resulting in a multi-conduit muffler with parallel exhaust gas flow. The cavity formed outside conduits 58, 59 and 60 and within body 55 and end closures 56 and 57 is adapted to contain an exhaust gas conditioning agent. In the refined embodiment shown, the cavity is divided into longitudinal chambers by partition members 66 and 67 forming substantially annular spaces between the conduits and the walls of the longitudinal chambers. Each of the substantially annular spaces is then further subdivided by baffle plates 68, 69, 70, 71, 72 and 73 into a plurality of (9) of substantially annular compartments, each adapted to contain exhaust gas conditioning agent. Conduits 58, 59 and 60 have longitudinal rows of louvers arranged transverse to the axis of the conduits along opposing surfaces such that one row of louvers in each conduit is inclined into the exhaust stream against the direction of flow and the other row of louvers in each conduit is inclined into the exhaust stream in the opposite direction.

In operation, exhaust gas is conducted from the exhaust manifold of an internal combustion engine by exhaust pipe 64. As previously mentioned, supplemental air can be mixed with the exhaust gas which often improves results when the exhaust gas conditioning agent functions as an oxidation catalyst. Exhaust pipe 64 slidably engages exhaust inlet port 74 and delivers exhaust gas into inlet header 53. Inlet header 53 distributes the exhaust gas to inlet ends 61, 62 and 63 of conduits 58, 59 and 60. The exhaust gas passes through the conduits and encounters exit louvers which deflect the exhaust gas out of the conduits and into the cavity outside the conduit, but within the body and end closures. The exhaust gas circulates in this cavity and contacts an exhaust gas conditioning agent contained therein and finally is aspirated back into conduits 58, 59 and 60 through the row of inlet louvers on each conduit. In the refined embodiment shown, the cavity outside the conduits and within the muffler body is divided into 9 substantially annular compartments by longitudinal partition members 66 and 67 and by baffle plates 68, 69, 70, 71, 72 and 73. This improves the contact of the exhaust gas with the conditioning agent by causing it to repeatedly circulate in a plurality of confined areas. The exhaust gas finally leaves the conduits through their exit ends and enters exhaust outlet header 54. It then passes through exit port 75 into tail pipe 65 which discharges the treated exhaust gas into the atmosphere at the desired remote location.

A wide variety of exhaust conditioning agents can be used in the exhaust conditioning device. The device is readily charged with the conditioning agent through charge ports provided for this purpose. The number of ports required depends on the number of compartments within the body. Since the compartments are separate from each other, a port is generally required for each compartment. For example, in the single-pass device shown in FIGS. 1–4 there are 3 compartments and thus 3 charge ports are used. In the three-pass device depicted in FIGS. 5–7 there are 9 compartments and hence 9 charge ports are used. In the simplest embodiment, which would be a single-pass device without any baffle plates, there would be one substantially annular compartment and only one charge port would be required.

Exhaust gas oxidation catalysts are useful as exhaust gas conditioning agents. These are usually metals or metal oxides such as vanadium, chromium, manganese, iron, cobalt, nickel, copper, molybdenum, palladium, platinum, titanium or tin, metals or metal oxides or mixtures of these metals or metal oxides. In order to improve their effectiveness they are usually impregnated on a suitable support such as alumina, silica, silica alumina, clay, zirconia, magnesia, silicon carbide, mullite, synthetic or natural zeolites, and the like.

A highly preferred exhaust catalyst is an activated alumina containing from about 0.1 to 25 weight percent copper, as an oxide of copper, and from 0.001 to 3 weight percent palladium. These catalysts are readily made by merely immersing an activated alumina in a solution of a soluble copper salt such as copper nitrate until the desired copper concentration is impregnated into the alumina. The copper-impregnated alumina is then removed and dried. It is then calcined, converting the copper nitrate to an oxide of copper. It is then subjected to a second impregnation using a palladium chloride solution, followed by a second drying and calcining step. Suitable methods for making this catalyst are shown in U.S. 3,224,981.

A second type of exhaust conditioning agent are those that serve to remove either particulate matter from the exhaust gas or to adsorb and retain matter which is normally solid but exists as a vapor in the exhaust due to its elevated temperature. Included in these types of materials are the various lead compounds formed during the combustion of gasoline containing a lead alkyl antiknock.

These materials are effectively removed or greatly reduced by employing as an exhaust conditioning agent alumina, marble chips, silicon carbide, iron nails, synthetic or natural zeolites, wire mesh, and the like. When alumina is used it is preferably in a granular or pellet form. It is also preferred that the alumina be an activated alumina such as those made by calcining α-alumina trihydrate, β-alumina trihydrate or α-alumina monohydrate. The calcination can be carried out at temperatures from about 140–800° C. Temperatures above about 1000° C. lead to α-alumina, a non-active refractory form of alumina which gives poorer results than the activated alumina. Suitable aluminas are commercially available. For example, F–1 type alumina manufactured by the Aluminum Company of America can be used. Another suitable alumina is type KA–101 alumina spheres made by the Kaiser Aluminum Company.

Another very useful exhaust conditioning agent when used in combination with the previously-described muffler is a wire mesh. Preferably the wire should have a diameter of from about 0.005 to about 0.2 inch and should be entangled and uniformly compacted to a density of from about 5 to 20 pounds per cubic foot. The wire mesh can be made of a variety of materials such as iron, copper, stainless steel, aluminum, and the like. Suitable wire mesh may be obtained commercially. Wire mesh is frequently used as a demisting means in distillation operations to prevent liquid droplets from being entrained and carried up a distillation column by the vapor. One such wire mesh found to be very efficient in removing particulate matter from the exhaust gas of an internal combustion engine operated on a fuel containing tetraethyllead and a halogen scavenger is a 0.011 diameter wire mesh made of type 304 stainless steel uniformly compacted to a density of 12 pounds per cubic foot.

What is claimed is:

1. A muffler for an internal combustion engine, said muffler comprising a body having end closures at each end, said body having longitudinal partition members dividing said body into a plurality of longitudinal chambers, a plurality of exhaust gas conduits each having an exhaust gas inlet end and an exhaust gas outlet end each of said chambers containing at least one of said exhaust gas conduits extending longitudinally through said chambers and through said end closures forming a plurality of substantially annular spaces between said conduits and the walls of said plurality of longitudinal chambers, the first of said plurality of exhaust gas conduits having said inlet end adapted to slidably engage the exhaust pipe of an internal combustion engine, means for conducting exhaust gas from each of said outlet ends, except the outlet end of the last of said conduits, to the exhaust gas inlet end of the next of said exhaust gas conduits, forming a continuous path of flow for said exhaust gas through each of said plurality of exhaust gas conduits in series, the last of said conduits adapted to slidably engage its exhaust gas outlet end with the tail pipe of an exhaust system, said conduits having longitudinal rows of louvers transverse to the axis of said conduits arranged along opposing surfaces of said conduits such that the rows of louvers arranged along one surface of said conduits deflect said exhaust gas passing through said conduits out of said conduits into said substantially annular spaces and such that the rows of louvers arranged along the opposing surface of said conduits aspirates said exhaust gas from said substantially annular spaces back into said conduits, causing said exhaust gas to circulate in said substantially annular spaces.

2. A muffler for an internal combustion engine, said muffler comprising a body having end closures at each end, said body having longitudinal partition members dividing said body into a plurality of longitudinal chambers, a plurality of exhaust gas conduits each having an exhaust gas inlet end and an exhaust gas outlet end, each of said chambers containing at least one of said exhaust gas conduits extending longitudinally through said chambers and through said end closures forming a plurality of substantially annular spaces between said conduits and the walls of said plurality of chambers, said exhaust inlet ends of said conduits communicating with each other through an exhaust inlet header, said exhaust inlet header having an exhaust inlet port adapted to slidably engage the exhaust pipe of an internal combustion engine, said exhaust outlet ends of said conduits communicating with each other through an exhaust outlet header, said exhaust outlet header having an exhaust exit port adapted to slidably engage the tail pipe of an exhaust system forming a parallel path of flow for said exhaust gas through each of said plurality of exhaust gas conduits, said conduits having longitudinal rows of louvers transverse to the axis of said conduits arranged along opposing surfaces of said conduits such that the rows of louvers arranged along one surface of said conduits deflect said exhaust gas passing through said conduits out of said conduits into said substantially annular spaces and such that the rows of louvers arranged along the opposing surface of said conduits aspirates said exhaust gas from said substantially annular spaces back into said conduits causing said exhaust gas to circulate in said substantially annular spaces.

3. A muffler for an internal combustion engine, said muffler comprising a body having end closures at each end, said body having longitudinal partition members dividing said body into a plurality of longitudinal chambers, a plurality of exhaust gas conduits each having an exhaust gas inlet end and an exhaust gas outlet end, each of said chambers containing at least one of said exhaust gas conduits extending longitudinally through said chambers and through said end closures forming a plurality of substantially annular spaces between said conduits and the walls of said plurality of longitudinal chambers, said muffler containing an exhaust gas conditioning agent within said annular spaces whereby said exhaust gas circulating within said annular spaces contacts said exhaust gas conditioning agent, the first of said plurality of exhaust gas conduits having said inlet end adapted to slidably engage the exhaust pipe of an internal combustion engine, means for conducting exhaust gas from each of said outlet ends, except the outlet end of the last of said conduits, to the exhaust gas inlet end of the next of said exhaust gas conduits, forming a continuous path of flow for said exhaust gas through each of said plurality of exhaust gas conduits in series, the last of said conduits adapted to slidably engage its exhaust gas outlet end with the tail pipe of an exhaust system, said conduits having longitudinal rows of louvers transverse to the axis of said conduits arranged along opposing surfaces of said conduits such that the rows of louvers arranged along one surface of said conduits deflect said exhaust gas passing through said conduits out of said conduits into said substantially annular spaces and such that the rows of louvers arranged along the opposing surface of said conduits aspirates said exhaust gas from said substantially annular spaces back into said conduits, causing said exhaust gas to circulate in said substantially annular spaces.

4. The muffler of claim 3 wherein said exhaust conditioning agent contained within said annular spaces is a wire mesh.

5. The muffler of claim 3 further characterized by having at least one baffle plate within said substantially annular spaces disposed transverse to the longitudinal axis of said substantially annular spaces dividing said substantially annular spaces into a plurality of substantially annular compartments containing said exhaust gas conditioning agent.

6. The muffler of claim 5 wherein said exhaust conditioning agent is wire mesh.

7. The muffler of claim 3 further characterized in having two longitudinal partition members dividing said body into three longitudinal chambers, each having a louvered exhaust gas conduit extending therethrough, forming a substantially annular space between said conduits and the walls of said longitudinal chambers.

8. The muffler of claim 7 wherein said annular space within the first of said three longitudinal chambers nearest the exhaust gas inlet contains an alumina, the annular cavity in the second of said three longitudinal chambers contains wire mesh, and the annular cavity within the third of said three longitudinal chambers nearest the exhaust gas outlet contains an activated alumina impregnated with from 0.1 to 25 weight percent of copper in an oxide form and from 0.001 to 3 weight percent of palladium.

9. A muffler for an internal combustion engine, said muffler comprising a body having end closures at each end, said body having longitudinal partition members dividing said body into a plurality of longitudinal chambers, a plurality of exhaust gas conduits each having an exhaust gas inlet end and an exhaust gas outlet end, each of said chambers containing at least one of said exhaust gas conduits extending longitudinally through said chambers and through said end closures forming a plurality of substantially annular spaces between said conduits and the walls of said plurality of chambers, said muffler containing an exhaust gas conditioning agent within said annular spaces whereby said exhaust gas circulating within said annular spaces contacts said exhaust gas conditioning agent, said exhaust inlet ends of said conduits communicating with each other through an exhaust inlet header, said exhaust inlet header having an exhaust inlet port adapted to slidably engage the exhaust pipe of an internal combustion engine, said exhaust outlet ends of said conduits communicating with each other through an exhaust outlet header, said exhaust outlet header having an exhaust exit port adapted to slidably engage the tail pipe of an exhaust system forming a parallel path of flow for said exhaust gas through each of said plurality of exhaust gas conduits, said conduits having longitudinal rows of louvers transverse to the axis of said conduits arranged along opposing surfaces of said conduits such that the rows of louvers arranged along one surface of said conduits deflect said exhaust gas passing through said conduits out of said conduits into said substantially annular spaces and such that the rows of louvers arranged along the opposing surface of said conduits aspirates said exhaust gas from said substantially annular spaces back into said conduits causing said exhaust gas to circulate in said substantially annular spaces.

10. The muffler of claim 9 wherein said exhaust gas conditioning agent is a wire mesh.

11. The muffler of claim 10 wherein said wire mesh has a wire diameter of from about 0.005 to 0.2 inch and wherein said mesh is compared to a density of from 5 to 20 pounds per cubic foot.

12. The muffler of claim 9 further characterized by having at least one baffle plate within said substantially annular spaces disposed transverse to the longitudinal axis of said substantially annular spaces dividing said substantially annular spaces into a plurality of substantially annular compartments containing said exhaust gas conditioning agent.

13. The muffler of claim 12 wherein said exhaust gas conditioning agent is a wire mesh.

14. The muffler of claim 12 further characterized by having exhaust conditioning agent retaining means covering said louvers in said conduits co-operating with said conduits in retaining said exhaust conditioning agent within said substantially annular compartments and allowing said exhaust gas to pass through said louvers.

15. The muffler of claim 14 wherein said exhaust conditioning agent is an alumina.

References Cited
UNITED STATES PATENTS

| | | | |
|---|---|---|---|
| 1,991,748 | 2/1935 | Johnson. | |
| 2,070,543 | 2/1937 | Cary et al. | |
| 2,071,119 | 2/1937 | Harger | 23—2.2 |
| 2,288,943 | 7/1942 | Eastman. | |
| 3,025,133 | 3/1962 | Robinson et al. | |
| 3,154,389 | 10/1964 | Hayes et al. | |
| 3,224,981 | 12/1965 | Stephens et al. | 23—2.2 XR |
| 3,237,399 | 3/1966 | Hamblin et al. | |
| 3,239,317 | 3/1966 | Rhodes. | |
| 3,247,665 | 4/1966 | Behrens. | |
| 3,290,876 | 12/1966 | Ernst. | |
| 3,313,373 | 4/1967 | Marx | 181—63 XR |
| 3,413,096 | 11/1968 | Britt. | |

MORRIS O. WOLK, Primary Examiner

B. S. RICHMAN, Assistant Examiner

U.S. Cl. X.R.

181—36, 63

PO-1050
(5/69)

UNITED STATES PATENT OFFICE
CERTIFICATE OF CORRECTION

Patent No. 3,511,617             Dated    May 12, 1970

Inventor(s)   Raymond G. Lyben

It is certified that error appears in the above-identified patent and that said Letters Patent are hereby corrected as shown below:

Column 3, lines 10-11, "the internal combustion engine with which it is used. In of exhaust gas, but it also serves to muffle the sound of" should read -- of exhaust gas, but it also serves to muffle the sound of the internal combustion engine with which it is used. In --. Column 10, Claim 11, line 3, "compared" should read -- compacted --.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents